Nov. 23, 1954          E. J. DILLMAN          2,695,154
                        SOLENOID VALVE

Filed Oct. 27, 1950                         3 Sheets-Sheet 2

INVENTOR.
Earnest J. Dillman
BY
Andrew K. Fouleds
his ATTORNEY

Nov. 23, 1954  E. J. DILLMAN  2,695,154
SOLENOID VALVE

Filed Oct. 27, 1950  3 Sheets-Sheet 3

INVENTOR.
Earnest J. Dillman
BY
Andrew K. Fueda
his ATTORNEY

United States Patent Office 2,695,154
Patented Nov. 23, 1954

2,695,154

SOLENOID VALVE

Earnest J. Dillman, Detroit, Mich., assignor to Detroit Controls Corporation, a corporation of Michigan Application October 27, 1950, Serial No. 192,483

10 Claims. (Cl. 251—77)

This invention relates to new and useful improvements in electrically operated gas valves and more particularly to improvements in solenoid valves.

Since solenoid operated gas valves are practically all operated on alternating current and since the plungers of solenoid valves frequently stick from tars and waxes carried in the gas stream these valves are subject to the disadvantage of A. C. hum or vibration and occasionally stick open. It is the object of this invention to overcome these and other disadvantages in solenoid valve construction to make a commercially practical valve.

One of the objects of this invention is to provide a solenoid operated valve of new and improved construction.

Another object is to provide a solenoid valve having an improved spring arrangement for overcoming the effect of residual magnetism in the solenoid coil.

Another object is to provide a solenoid valve having an improved arrangement including a closure member operable to close off the guide tube of the solenoid coil when the valve is open.

Another object is to provide a solenoid valve of improved construction having an improved means for steadying the valve plunger in an open position to overcome the effects of A. C. hum and vibration.

Another object is to provide an improved solenoid valve having an improved means for steadying the valve in an open position to overcome A. C. hum and vibration which includes a kick-off spring arrangement combined therewith for overcoming the effect of residual magnetism.

Another object is to provide a solenoid valve having a simple and improved manual opening means.

Another object is to provide a solenoid valve which is simply constructed, easily manufactured and efficient in operation.

Other objects will become apparent from time to time throughout the specification and claims as hereinafter related.

This invention comprises the new and improved construction and combination of parts to be more fully described hereinafter and the novelty of which will be particularly pointed out and distinctly claimed.

Figure 1:
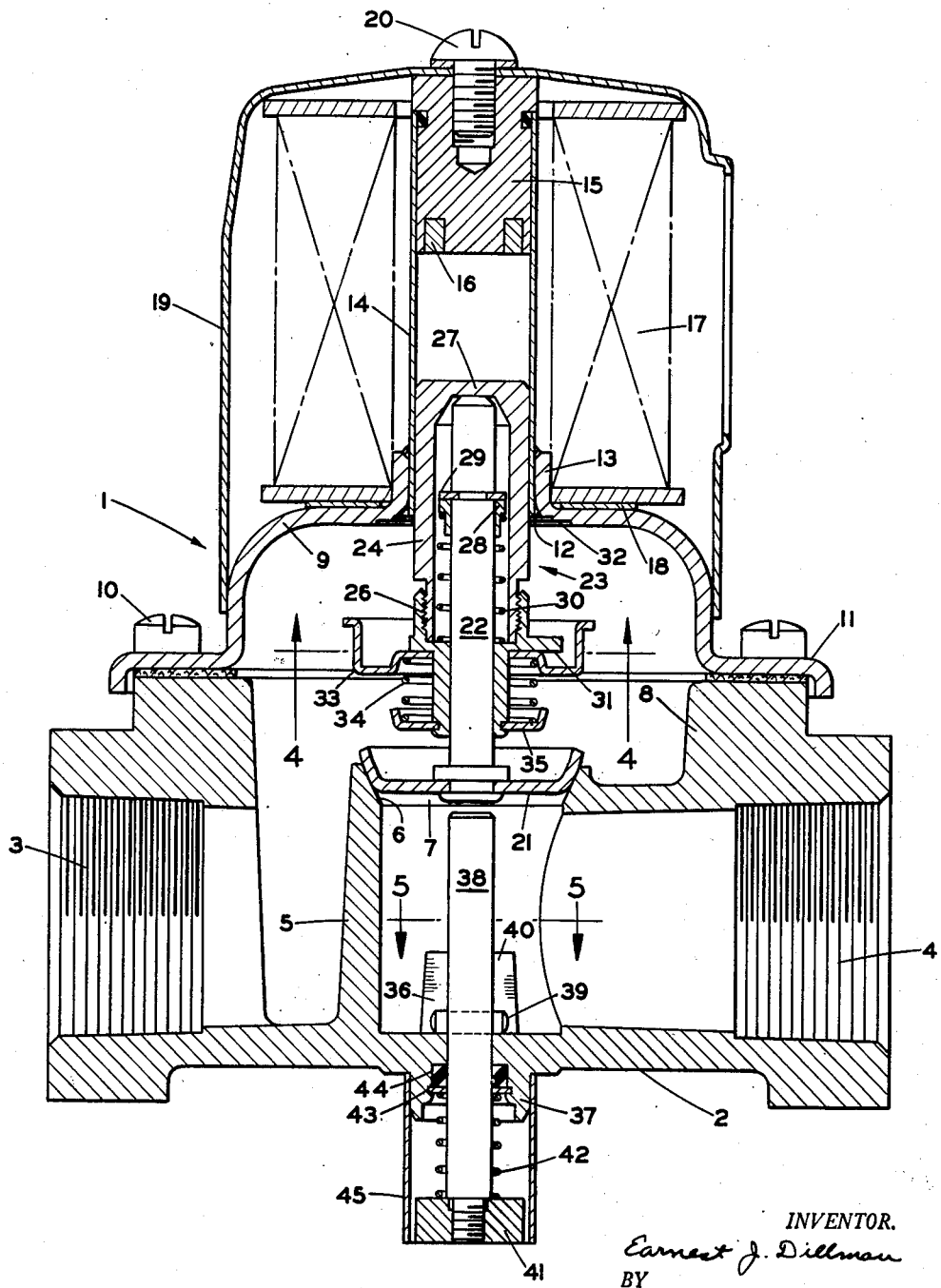
Figure 2:
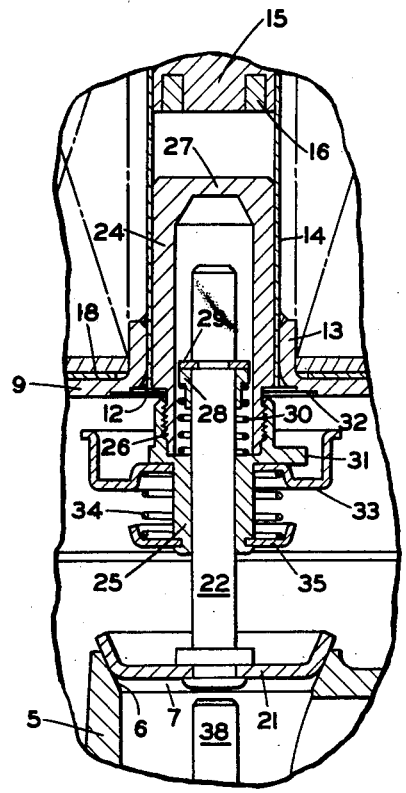
Figure 3:
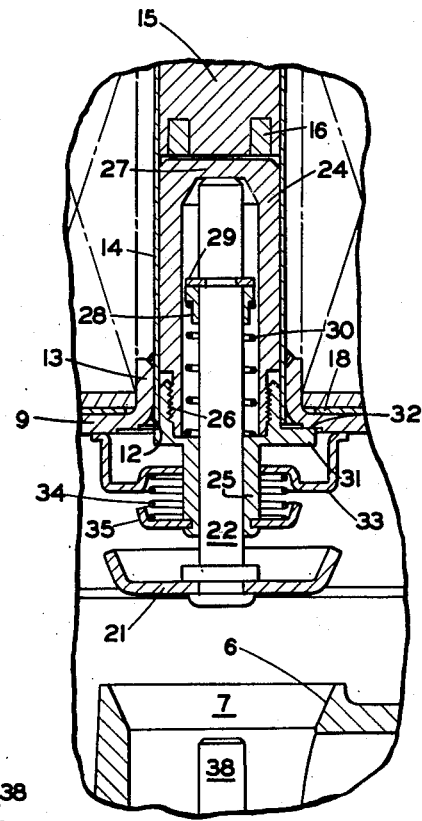
Figure 5:
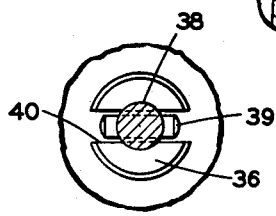
Figure 4:
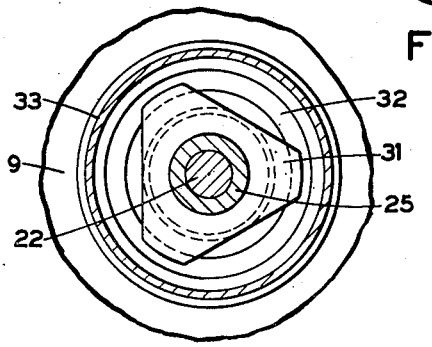
Figure 6:
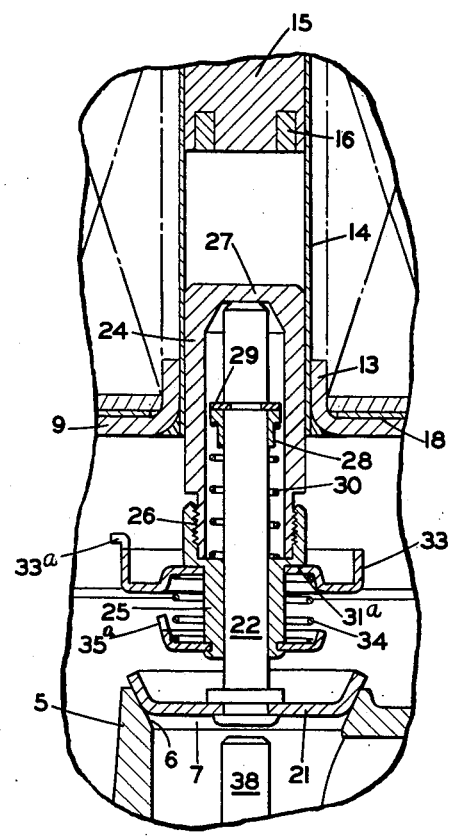
Figure 7:
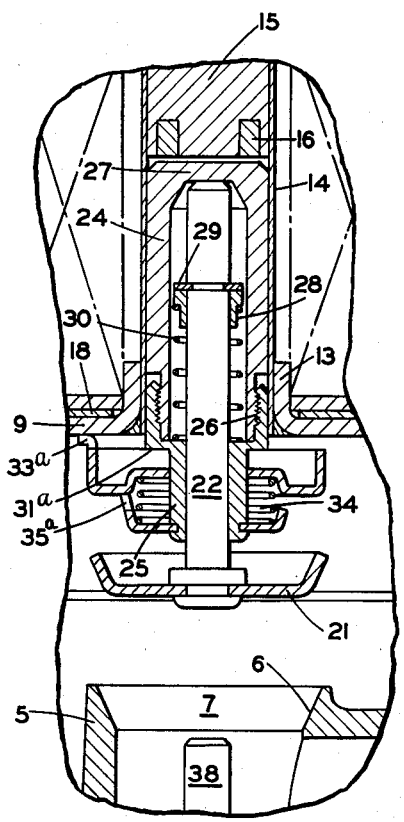

In the accompanying drawings to be taken as part of this specification there are clearly and fully illustrated two preferred embodiments of this invention in which drawings:

Figure 1 is a view in longitudinal central section of a solenoid valve comprising one embodiment of this invention, Fig. 2 is a detail sectional view of the valve and solenoid plunger as shown in Fig. 1 and showing the plunger moved partially upward and the valve still closing the valve port, Fig. 3 is a detail sectional view similar to the one shown in Fig. 2 but showing the solenoid plunger and valve in a fully opened position, Fig. 4 is a detail sectional view taken on the line 4—4 of Fig. 1, Fig. 5 is a detail sectional view taken on the line 5—5 of Fig. 1, Fig. 6 is a longitudinal central section of a valve similar to that shown in Fig. 1 but showing the spring supporting cup member as the sole stop member and steadying means for the solenoid plunger, and Fig. 7 is a detail sectional view of the valve shown in Fig. 6 in fully opened position corresponding to the view shown in Fig. 3.

Referring to the drawings by characters of reference and particularly Fig. 1 there is shown a solenoid operated valve generally designated as 1 comprising a valve casing 2 having an inlet 3 and an outlet 4. The casing 2 has an internal partition 5 providing a valve seat 6 for a valve port 7. The casing 2 has a top opening 8 overlying the valve port 7. There is provided a cover member 9 which closes the top opening 8 and is secured to the casing 2 by a plurality of screws or bolts 10 and having a sealing washer 11 interposed between the cover 9 and top wall of the casing 2. The cover 9 has a central aperture 12 and upwardly projecting sleeve 13 overlying and alined with the valve port 7. There is also provided a guide tube 14 which has its lower end secured in the aperture 12 and sleeve 13 and has secured and sealed in its upper end a plug closure member 15 of a magnetic material and carrying a non-magnetic shading coil 16 therein. A solenoid coil 17 surrounds the guide tube 14 and is supported on the cover 9 on a washer member 18. An external cover member 19 encloses the coil 17 and most of the cover 9 and is held in position by a screw or bolt 20 fitting a threaded aperture in the plug member 15. A valve member 21 is positioned to seat on the valve seat 6 and close the port 7 and has an upwardly extending valve stem 22. The valve stem 22 extends upwardly into a hollow solenoid plunger 23 comprising an upper hollow portion 24 and a lower sleeve portion 25 threadedly connected together as at 26. The valve stem 22 is slidable through the plunger sleeve portion 25 and has its upper end normally abutting the upper end wall 27 of the hollow plunger portion 24. A sleeve member 28 is carried on the stem 22 and held against movement by a washer 29 and provides a shoulder receiving the upper end of a spring 30, the lower end of which seats upon a shoulder on the sleeve portion 25 of the plunger 23. The plunger sleeve portion 25 has formed integral therewith three projecting abutment portions 31 (see Fig. 4) which lie in a predetermined plane and provide stops to stop the plunger when in an up position with its upper end 27 spaced slightly from the lower face of the plug closure member 15. The stop member 31 is engageable with a machined portion 32 of the cover 9 and provides a steadying action for the plunger 23 to overcome the effect of A. C. hum and vibration. The plunger 23 is provided with a cup-shaped or dished member 33 which is slidably positioned on the sleeve portion 25 of the plunger and is held against the underside of the stops 31 by a spring 34 which is supported by a dished spring supporting member 35 carried on the sleeve portion 25. The lower wall of the valve casing 2 has an aperture therein with upwardly and downwardly projecting sleeves 36 and 37 respectively extending therefrom. A longitudinally reciprocal rod 38 is slidably fitted through the sleeves 36 and 37 and is movable for engagement with the valve 21. The rod 38 has a pin 39 extending transversely therethrough which is reciprocal with the rod 38 in a slot 40 (see Fig. 5) in the sleeve 36. The rod 38 has a cylindrical push button 41 threaded on the lower end thereof which supports one end of a spring 42, the other end of which engages a washer 43 holding in position some packing 44 surrounding the rod 38. The rod 38 and push button 41 are protected against tampering to a certain extent by a cylindrical sleeve 45 secured to the casing 2 and surrounding the sleeve portion 37.

Operation

As is well known in the art, very little power is obtained from a solenoid coil and it is necessary to use the impact force or inertia of motion of a solenoid plunger for actuating a valve. Most solenoid valves are therefor constructed so that the plunger will have lost motion relative to the valve stem when moved upward and at its point of maximum speed will strike a shoulder on the valve stem with an impact force to lift the same and open the valve. In such valves there is an inherent disadvantage that the valve can only be opened by the amount of movement of the plunger past the impact position. In this valve the valve stem 22 is normally held in a position engaging the end wall 27 of the solenoid plunger 23 by the spring 30. When the plunger 23 is moved upward upon energization of the solenoid coil 17 the valve 21 will be held closed by pressure of the gas or other fluid upon it. The plunger 23 will therefore cause the spring 30 to be compressed until sufficient inertial force is transmitted through the spring to the valve stem 22 to cause the valve to be opened or until the spring 30 is completely compressed to be the equivalent of an impact force with the shoulder on the valve stem. By this arrangement the force is transmitted through the spring and thus eliminates a certain amount of noise caused by impact of the solenoid plunger on the valve stem shoulder. When the solenoid plunger reaches its fully opened position the spring 30 is able to lift the valve stem 22 until it engages the end wall 27 of the plunger 23 as is shown in Fig. 3. This arrangement permits the full use of the impact force or inertia of motion of the solenoid plunger and yet allows the valve to be moved through as great a range of opening movement as the plunger itself. When the plunger 23 is in the fully opened position shown in Fig. 3 the shading coil 16 provides a current during the critical range of current alterations and thereby provides a magnetic flux to hold the plunger firmly while the alternating current is passing through its point of zero voltage. The stop members 31 being three in number define a plane and engage a machined surface 32 on the cover 9 (as is shown in Figs. 3 and 4) and function to steady the plunger to overcome the effect of A. C. hum and vibration. The cup shaped or dished member 33 engages the cover 9 when the plunger 23 is in its up position and compresses the spring 34 to provide a downward thrust for overcoming the effect of residual magnetism in the solenoid. The dished member 33 is held tightly against the cover 9 and functions as a closure member to prevent the gas which is flowing through the valve from circulating into the guide tube and depositing tars or waxes therein which might cause the plunger to stick in an open position.

In the event of power failure the rod 38 may be actuated to open the valve to permit flow of gas therethrough. By the arrangement shown herein the push button 41 would be depressed to move the rod 38 to engage the valve member 21 and move the same to an open position. When the rod 38 is moved sufficiently upward until the pin 39 has cleared the end of the sleeve 40 it is then rotated approximately 90° so that the pin 39 will cooperate with the end of the sleeve 36 to hold the rod 38 in an actuated position holding open the valve member 21. To close the valve from a manually opened position, it is necessary only to rotate the rod 38 until the pin 39 again registers with the slot 40 whereupon the spring 42 will move the same until the pin 39 engages the bottom wall of the casing 2.

In the form of the invention shown in Figs. 6 and 7 the stop member 31 for eliminating vibration or hum is combined with the cup shaped or dished member 33. Since this is the only change in construction all parts of this modification which are the same as those shown by Figs. 1 to 5 will be given the same numerals of reference.

In this arrangement the members 31 are eliminated and the sleeve member 25 has only a shoulder 31ª against which the dished member 33 is held by the spring 34. The member 33 is formed so that its outwardly projecting flange portion 33ª is cut away except at three points for engagement with the cover 9. In this arrangement when the plunger 23 is moved to a fully opened position the three flange portions 33ª engage the cover 9 to steady the plunger 23 and the member 33 is moved longitudinally on the sleeve member 25 compressing the spring 34 until the member 33 engages the fingers 35ª of the spring supporting disc 35, see Fig. 7, thus stopping the upward movement of the plunger 23. In this arrangement the sealing or closure action of the member 33 is lost but the stop arrangement and release or kick-off spring arrangement are combined in a single member to provide a simpler construction. It should also be noted that stop flanges 33ª engage the cover at a greater radial distance than the stops 31 in Fig. 1 and thus provide a more effective steadying action. The operation of this form of the valve is identical with that described and shown in Figs. 1 to 5 except as the member 33 is altered to provide a different stop and steadying arrangement.

Although there has been shown only two embodiments of this invention, it will be obvious to those skilled in the art that modifications thereof might be made without departing from the scope and intent of this invention which should be limited only by the scope of the claims appended hereto.

Having thus described the invention what is claimed and desired to be secured by Letters Patent of the United States is:

1. In a solenoid operated valve, a valve casing having an inlet and an outlet and a top opening, an internal partition in said casing between said inlet and outlet and having a valve port therein facing said top opening, a cover for said casing closing said top opening and having an aperture with an upwardly projecting sleeve overlying said valve port, a guide tube having its lower end secured in said cover sleeve, a solenoid coil surrounding said guide tube and carried by said cover, a plug closure member of magnetic material secured in and closing the upper end of said guide tube and carrying a non-magnetic shading coil therein, a valve member closing said valve port, a solenoid plunger reciprocably movable in said guide tube and connected to said valve member for moving the same, a stop member on said plunger and operable to stop said plunger in an up position with its upper end spaced from said plug closure member, an inverted dished closure member reciprocably carried by said plunger and engageable with said cover to seal said guide tube from the material passing through said valve while the valve port is open, and a coil spring surrounding and compressed between said dished member and said plunger and urging said dished member toward said cover.

2. In a solenoid operated valve, a valve casing having an inlet and an outlet and a top opening, an internal partition in said casing between said inlet and outlet and having a valve port therein facing said top opening, a cover for said casing closing said top opening and having an aperture with an upwardly projecting sleeve overlying said valve port, a guide tube having its lower end secured in said cover sleeve, a solenoid coil surrounding said guide tube and carried by said cover, a plug closure member of magnetic material secured in and closing the upper end of said guide tube and carrying a non-magnetic shading coil therein, a valve member closing said valve port, a solenoid plunger reciprocally movable in said guide tube and connected to said valve member for moving the same, a stop member on said plunger and operable to stop said plunger in an up position with its upper end spaced from said plug closure member, an inverted dished member reciprocally carried by said plunger and engageable with said cover at a considerable radial distance outside said guide tube to steady said plunger against lateral vibration while said plunger is in a valve opened position, and a coil spring surrounding said plunger and compressed between said dished member and said plunger, said spring being further compressed in the up position of said plunger and acting to move said valve member toward closed position upon deenergization of said coil.

3. In a solenoid operated valve, a valve casing having an inlet and an outlet and a top opening, an internal partition in said casing between said inlet and outlet and having a valve port therein facing said top opening, a cover for said casing closing said top opening and having an aperture with an upwardly projecting sleeve overlying said valve port, a guide tube having its lower end secured in said cover sleeve, a solenoid coil surrounding said guide tube and carried by said cover, a plug closure member of magnetic material secured in and closing the upper end of said guide tube and carrying a non-magnetic shading coil therein, a valve member closing said valve port, a solenoid plunger reciprocally movable in said guide tube and connected to said valve member for moving the same, a stop member on said plunger engageable with said cover to stop said plunger in an up position with its upper end spaced from said closure member, an inverted dished closure member having a sliding fit on said plunger, a spring surrounding and carried by said plunger and cooperable with said dished closure member to hold the same in a predetermined position, said dished closure member being engageable with said cover when said plunger is in a valve opened position to seal said guide tube against foreign matter in the fluid passing through the valve and said dished closure member being slidable longitudinally of said plunger when moved into engagement with said cover to compress said spring to provide a downward thrust for overcoming residual magnetic attraction upon deenergization of said solenoid coil.

4. In a solenoid operated valve, a valve casing having an inlet and an outlet and a top opening, an internal partition in said casing between said inlet and outlet and having a valve port therein facing said top opening, a cover for said casing closing said top opening and having an aperture with an upwardly projecting sleeve overlying said valve port, a guide tube having its lower end secured in said cover sleeve, a solenoid coil surrounding said guide tube and carried by said cover, a plug closure member of magnetic material secured in and closing the upper end of said guide tube and carrying a non-magnetic shading coil therein, a valve member closing said valve port, a solenoid plunger reciprocally movable in said guide tube and connected to said valve member for moving the same, a stop member on said plunger cooperable with said cover to stop said plunger in an up position with its upper end spaced from said closure member, an inverted dished member having a sliding fit on said plunger, a spring surrounding and carried by said plunger and cooperable with said dished member to hold the same in a predetermined position, said dished member being engageable with said cover when said plunger is in a valve opened position to steady said plunger against lateral vibration and said dished member being slidable longitudinally of said plunger when moved into engagement with said cover to compress said spring to provide a downward thrust for overcoming residual magnetic attraction upon deenergization of said solenoid coil.

5. In a solenoid operated valve, a valve casing having an inlet and an outlet and a top opening, an internal partition in said casing between said inlet and outlet and having a valve port therein facing said top opening, a cover for said casing closing said top opening and having an aperture with an upwardly projecting sleeve overlying said valve port, a guide tube having its lower end secured in said cover sleeve, a solenoid coil surrounding said guide tube and carried by said cover, a plug closure member of magnetic material secured in and closing the upper end of said guide tube and carrying a non-magnetic shading coil therein, a valve member closing said valve port, a solenoid plunger reciprocally movable in said guide tube and connected to said valve member for moving the same, means on said plunger operable to stop said plunger in an up position with its upper end spaced from said closure member, an inverted dished member having a sliding fit on said plunger, a spring surrounding and carried by said plunger and cooperable with said dished member to hold the same in a predetermined position, said dished member being engageable with said cover when said plunger is in a valve opened position to steady said plunger against lateral vibration, and said dished member being slidable longitudinally of said plunger when moved into engagement with said cover to compress said spring to provide a downward thrust for overcoming residual magnetic attraction upon deenergization of said solenoid coil.

6. In a solenoid operated valve, a valve casing having an inlet and an outlet and a top opening, an internal partition in said casing between said inlet and said outlet and having a valve port therein facing said top opening, a cover for said casing closing said top opening and having an aperture with an upwardly projecting sleeve overlying said valve port, a guide tube having its lower end secured in said sleeve, a solenoid coil surrounding said guide tube and carried by said cover, a plug closure member of magnetic material secured in and closing the upper end of said guide tube and carrying a non-magnetic shading coil therein, a valve member closing said valve port, a solenoid plunger reciprocally movable in said guide tube and connected to said valve member for moving the same, said plunger having formed integrally therewith a stop member comprising three projecting abutments defining a plane and engageable with said cover to stop said plunger with its upper end spaced from said guide tube closure member and to steady said plunger against lateral vibration, and an inverted dished closure member carried by said plunger and surrounding said stop member and engageable with said cover to steady said plunger and to seal off said guide tube when said plunger is in a valve opened position, and means movably supporting said dished closure member relative to said stop member so that said stop member and said dished closure member are both engageable with said cover.

7. In a solenoid operated valve, a valve casing having an inlet and an outlet and a top opening, an internal partition in said casing between said inlet and said outlet and having a valve port therein facing said top opening, a cover for said casing closing said top opening and having an aperture with an upwardly projecting sleeve overlying said valve port, a guide tube having its lower end secured in said sleeve, a solenoid coil surrounding said guide tube and carried by said cover, a plug closing member of magnetic material secured in and closing the upper end of said guide tube and carrying a non-magnetic shading coil therein, a valve member closing said valve port, a solenoid plunger reciprocally movable in said guide tube and connected to said valve member for moving the same, said plunger having formed integrally therewith a stop member comprising three projecting abutments defining a plane and engageable with said cover to stop said plunger with its upper end spaced from said guide tube closure member and to steady said plunger against lateral vibration, an inverted dished closure member longitudinally movable on said plunger and engageable with said cover to seal off said guide tube when said plunger is in a valve opened position, a spring holding said dished member in an initial position, and said dished member being movable upon engagement with said cover to compress said spring and provide a downward thrust for overcoming residual magnetic attraction.

8. In a solenoid operated valve, a valve casing having an inlet and an outlet and a top opening, an internal partition in said casing between said inlet and said outlet and having a valve port therein facing said top opening, a cover for said casing closing said top opening and having an aperture with an upwardly projecting sleeve overlying said valve port, a guide tube having its lower end secured in said sleeve, a solenoid coil surrounding said guide tube and carried by said cover, a plug closure member of magnetic material secured in and closing the upper end of said guide tube and carrying a non-magnetic shading coil therein, a valve member closing said valve port and having a valve stem, a hollow solenoid plunger having a closed end wall and reciprocally movable in said guide tube and receiving said valve stem, said plunger and stem having cooperating shoulders, a lost motion spring interposed between said shoulders and holding said stem abutting said plunger end wall, said spring being operable to permit an initial lost motion of said plunger relative to said stem, to transmit a valve opening force from said plunger to said stem, and to lift said stem to the full height of movement of said plunger, said plunger having formed integrally therewith a stop member comprising three projecting abutments defining a plane and engageable with said cover to stop said plunger with its upper end spaced from said guide tube closure member and to steady said plunger against lateral vibration, an inverted dished closure member longitudinally movable on said plunger and engageable with said cover to seal off said guide tube when said plunger is in a valve opened position, a spring holding said dished member in an initial position, and said dished member being movable upon engagement with said cover to compress said spring and provide a downward thrust for overcoming residual magnetic attraction.

9. In a solenoid operated valve, a valve casing having an inlet and an outlet and a top opening, an internal partition in said casing between said inlet and said outlet and having a valve port therein facing said top opening, a cover for said casing closing said top opening and having an aperture with an upwardly projecting sleeve overlying said valve port, a guide tube having its lower end secured in said sleeve, a solenoid coil surrounding said guide tube and carried by said cover, a plug closure member of magnetic material secured in and closing the upper end of said guide tube and carrying a non-magnetic shading coil therein, a valve member closing said valve port, a solenoid plunger reciprocally movable in said guide tube and connected to said valve member for moving the same, said plunger having a stop abutment thereon to stop said plunger in an up position with its upper end spaced from said plug closure member, an inverted dished member carried by and having a sliding fit on said plunger and having three projecting portions defining a plane and engageable with said cover outside said guide tube to steady said plunger against lateral vibration, said dished member being moved tightly against said plunger stop abutment when engaging said cover, and a coil spring positioned between said stop abutment and said dished member to be compressed by movement thereof to provide a downward thrust operable to overcome residual magnetic attraction of said solenoid coil.

10. In a solenoid operated valve, a valve casing having an inlet and an outlet and a top opening, an internal partition in said casing between said inlet and said outlet and having a valve port therein facing said top opening, a cover for said casing closing said top opening and having an aperture with an upwardly projecting sleeve overlying said valve port, a guide tube having its lower end secured in said sleeve, a solenoid coil surrounding said guide tube and carried by said cover, a plug closure member of magnetic material secured in and closing the upper end of said guide tube and carrying a non-magnetic shading coil therein, a valve member closing said valve port and having a valve stem, a hollow solenoid plunger having a closed end wall and reciprocally movable in said guide tube and receiving said valve stem, said plunger and stem having cooperating shoulders, a lost motion spring interposed between said shoulders and holding said stem abutting said plunger end wall, said spring being operable to permit an initial lost motion of said plunger relative to said stem, to transmit a valve opening force from said plunger to said stem, and to lift said stem to the full height of movement of said plunger, said plunger having a stop abutment thereon to stop said plunger in an up position with its upper end spaced from said plug closure member, an inverted dished member carried by and having a sliding fit on said plunger and having three projecting portions defining a plane and engageable with said cover outside said guide tube to steady said plunger against lateral vibration, said dished member being moved tightly against said plunger stop abutment when engaging said cover, and a coil spring positioned between said stop abutment and said dished member to be compressed by movement thereof to provide a downward thrust operable to overcome residual magnetic attraction of said solenoid coil.

References Cited in the file of this patent
UNITED STATES PATENTS

| Number | Name | Date |
|---|---|---|
| 1,978,737 | Bower | Oct. 30, 1934 |
| 2,121,657 | Fisher | June 21, 1938 |
| 2,222,419 | McCarthy | Nov. 19, 1940 |
| 2,238,401 | Shaw | Apr. 15, 1941 |
| 2,360,945 | Garner | Oct. 24, 1944 |
| 2,596,409 | Johnson | May 13, 1952 |